(12) United States Patent
Webster et al.

(10) Patent No.: US 10,677,210 B2
(45) Date of Patent: Jun. 9, 2020

(54) AIR-ASSISTED FUEL INJECTION SYSTEM FOR IGNITION QUALITY DETERMINATION

(71) Applicant: Advanced Engine Technology Ltd., Nepean (CA)

(72) Inventors: Gary Webster, Ottawa (CA); Luc Menard, Woodlawn (CA); David Gardiner, Mallorytown (CA)

(73) Assignee: CFR ENGINES CANADA ULC, Pewaukee, WI (US)

( * ) Notice: Subject to any disclaimer, the term of this patent is extended or adjusted under 35 U.S.C. 154(b) by 0 days.

(21) Appl. No.: 16/204,356

(22) Filed: Nov. 29, 2018

(65) Prior Publication Data
US 2019/0162150 A1 May 30, 2019

Related U.S. Application Data

(60) Provisional application No. 62/592,669, filed on Nov. 30, 2017.

(51) Int. Cl.
| | |
|---|---|
| *F02M 63/00* | (2006.01) |
| *F02M 57/02* | (2006.01) |
| *F02M 49/02* | (2006.01) |
| *F02M 67/12* | (2006.01) |
| *F02M 65/00* | (2006.01) |
| *G01M 15/04* | (2006.01) |
| *F02M 67/02* | (2006.01) |
| *F02D 19/08* | (2006.01) |

(52) U.S. Cl.
CPC ............ *F02M 67/12* (2013.01); *F02M 49/02* (2013.01); *F02M 57/028* (2013.01); *F02M 63/0075* (2013.01); *F02M 65/00* (2013.01); *F02D 19/085* (2013.01); *F02D 2200/0611* (2013.01); *F02M 67/02* (2013.01); *G01M 15/042* (2013.01)

(58) Field of Classification Search
CPC .. F02M 49/02; F02M 57/028; F02M 63/0075; F02M 67/02; F02M 67/12
USPC ........ 123/499, 507, 508, 531–533; 73/35.02, 73/114.42, 114.48
See application file for complete search history.

(56) References Cited

U.S. PATENT DOCUMENTS

| | | | | |
|---|---|---|---|---|
| 2,871,796 | A * | 2/1959 | Dreisin .................. | F02M 45/06 123/299 |
| 4,322,174 | A * | 3/1982 | Ishii ....................... | F02M 59/48 123/509 |
| 4,430,977 | A * | 2/1984 | Shimada ................ | F02M 39/00 123/449 |
| 4,693,420 | A * | 9/1987 | Klomp ................... | F02M 67/04 123/447 |
| 4,754,737 | A * | 7/1988 | Ishida ..................... | F02D 1/12 123/357 |
| 4,760,831 | A * | 8/1988 | Altdorf .................. | F02M 59/20 123/495 |
| 5,743,238 | A * | 4/1998 | Shorey ................... | F02M 57/02 123/458 |

(Continued)

*Primary Examiner* — Erick R Solis
(74) *Attorney, Agent, or Firm* — Thomas Horstemeyer, LLP

(57) ABSTRACT

Disclosed is an air-assisted fuel injection system, comprising a cylindrical bore; a plunger and a barrel within the cylindrical bore, the plunger having a flat surface; and a securing means abutting against the flat surface to keep the plunger from rotating within the cylindrical bore.

5 Claims, 6 Drawing Sheets

(56) References Cited

U.S. PATENT DOCUMENTS

| | | | | |
|---|---|---|---|---|
| 5,906,190 | A * | 5/1999 | Hole | G01N 33/2817 |
| | | | | 123/531 |
| 8,202,064 | B2 * | 6/2012 | Tian | F04B 11/0091 |
| | | | | 123/446 |
| 2008/0230036 | A1 * | 9/2008 | Bauman | F02M 37/06 |
| | | | | 123/508 |
| 2009/0230677 | A1 * | 9/2009 | Mannucci | F02M 55/004 |
| | | | | 285/318 |
| 2009/0269226 | A1 * | 10/2009 | De Minco | F04B 1/0408 |
| | | | | 417/437 |
| 2010/0000476 | A1 * | 1/2010 | Kunz | F01L 1/14 |
| | | | | 123/90.5 |
| 2012/0234277 | A1 * | 9/2012 | Dorn | F01L 1/146 |
| | | | | 123/90.48 |

\* cited by examiner

AIR-ASSISTED FUEL INJECTION SYSTEM FOR IGNITION QUALITY DETERMINATION

CROSS-REFERENCE TO RELATED APPLICATIONS

This application claims priority to, and the benefit of, U.S. Provisional Patent Application No. 62/592,669, entitled "Improved Air-Assisted Fuel Injection System for Ignition Quality Determination" and filed on Nov. 30, 2017, which is incorporated by reference as if set forth herein its entirety.

FIELD OF THE INVENTION

The present invention relates to testing ignition quality of a fuel. More specifically, the present invention relates to an air-assisted fuel injection system for ignition quality determination.

BACKGROUND OF THE INVENTION

There is a need to measure the cetane numbers, octane numbers and like parameters, of various kinds of fuels, such as middle distillate fuels and gasolines. The cetane numbers relate to the ignition delay characteristics, the low temperature starting ability, and the exhaust emission properties of the fuel for a given engine configuration. The octane numbers relate to fuel properties that enable avoidance of sudden explosive combustion conditions known as knock for a given engine configuration.

Prior techniques involve carrying out combustion tests in a combustion chamber. The fuel must be injected into the chamber under carefully controlled conditions. Prior art methods involve the use of a barrel and plunger, but are not sufficiently well controlled, particularly with regard to the quantity of fuel, the rate of injection, and the pressure at which the fuel is injected into the combustion chamber. All these parameters must be very precisely controlled in order to obtain accurate repeatable measurements. Furthermore, prior art techniques do not lend themselves to continual on-line monitoring.

Current Applicant sought to alleviate these problems with an air-assisted fuel injection system which is described in U.S. Pat. No. 5,906,190, the contents of which are incorporated by reference herein. This system relies on an in-line piston which acts directly on the plunger to ensure positive contact.

However, this system is still subject to some inconsistency and variation in the quantity of fuel injected into the combustion chamber. The present inventors conducted numerous, long-term experiments trying to determine the cause of these variations. The inventors experimented with temperature and air control settings, the pump settings to the injection settings and the reservoir, none of which resulted in any reduction in these variations.

Typical existing injection systems have loose tolerances and good repeatability, particularly of the injection profile, has been very difficult if not impossible to achieve. A multitude of problems arise when trying to inject accurately small quantities of fuel.

SUMMARY OF THE INVENTION

An air-assisted fuel injection system with improved ability to measure the cetane number of the fuel for ignition quality determination and improved ability to measure the octane number of the fuel for anti-knock determination.

In one aspect, there is provided, an air-assisted fuel injection system, comprising: a cylindrical bore; a plunger and a barrel within the cylindrical bore, the plunger having a flat surface; a securing means abutting against the flat surface to keep the plunger from rotating within the cylindrical bore.

There could also be a restraining mechanism to avoid ball rotation during contact. There could also be a steel cam follower rotational locking mechanism.

In one embodiment, the steel cam follower is a disk slideable in the cylindrical bore. In one embodiment, the securing means is a dowel pin. In one embodiment, the barrel and plunger are machined using electric discharge machining.

There are many advantages in using a fuel injection system contemplated by embodiments of the invention. First, mass injection stability for injection of fuel. Second, provides lower standard deviations between 32 injections during regular fuel tests. Third, stable mass of injection leads to lower standard deviation of test results (injection delay/DCN) between 2 IQTs operated by 2 operators.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Figure 1:
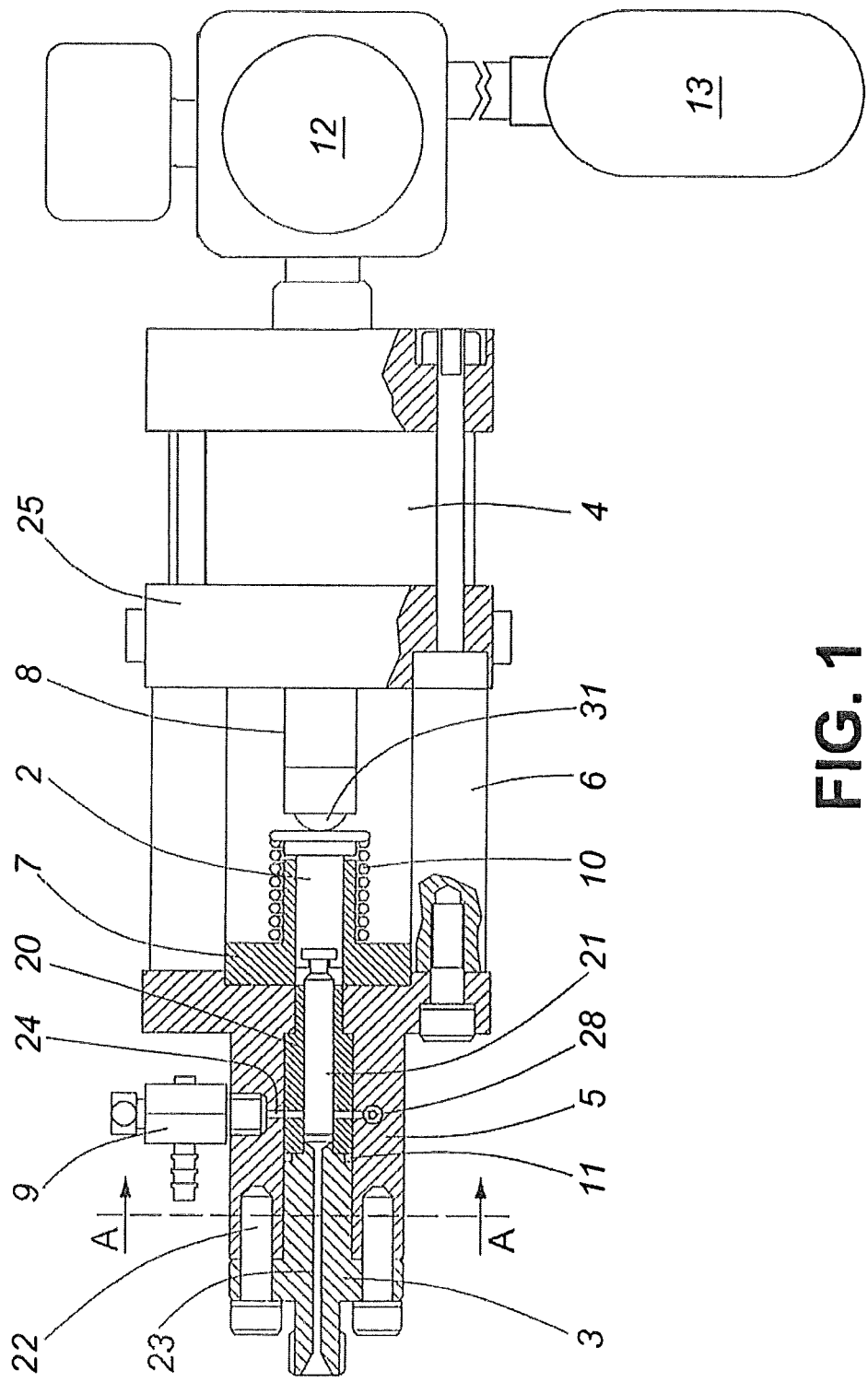
FIG. 1 is a longitudinal cross section of modular fuel injection pump for use in an injection quality tester (IQT) in accordance with embodiments of the invention.
Figure 2A:
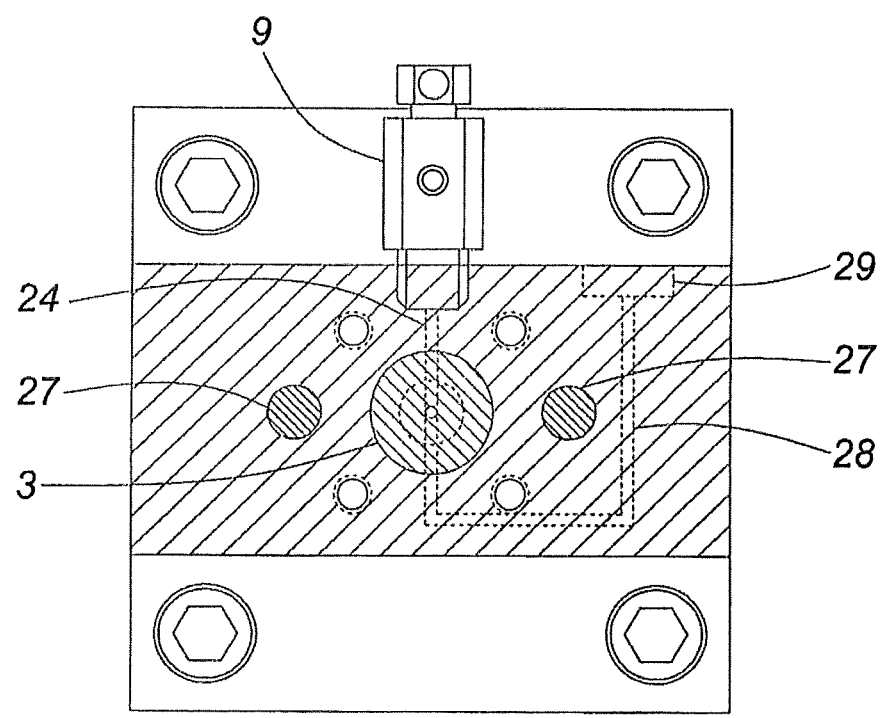
FIG. 2a is an illustration of a modular fuel injection pump of FIG. 1 cut along section A-A.
Figure 2B:
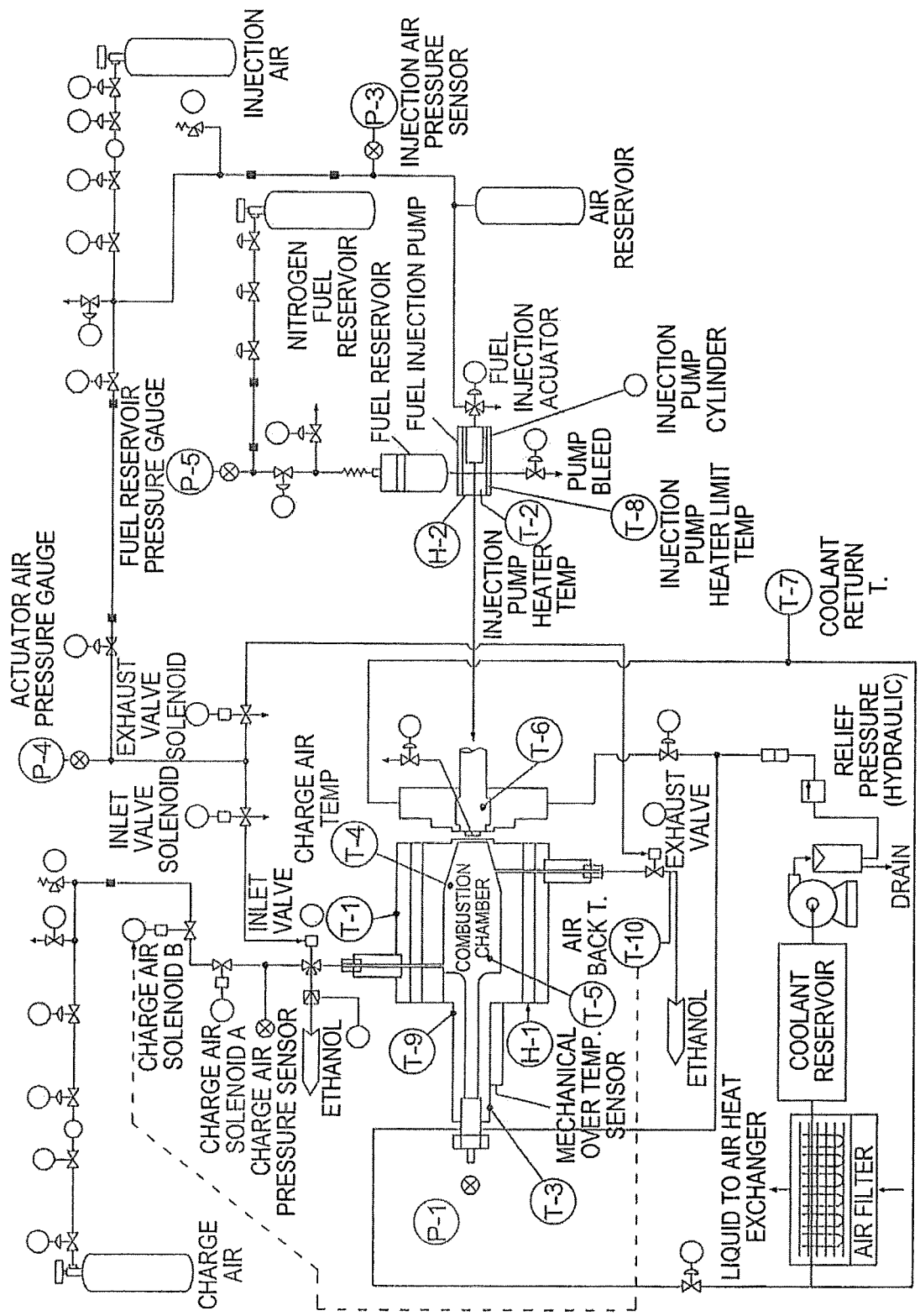
FIG. 2b is a schematic of an IQT using a fuel injection pump of FIG. 1.

Referring to FIG. 1 and FIGS. 2a and 2b, a modular injection unit injects fuel through a fuel delivery passage 23 into a combustion chamber (shown in FIG. 2b) where ignition takes place.

The injection unit comprises a pump block 5 with a cylindrical bore 22 containing a barrel 20 and plunger 21. The plunger 21 faces a narrow fuel delivery passage 23 in barrel clamp 3, which is attached to the pump block 5. The fuel delivery passage 23 communicates with the combustion chamber and extends into the bore 22. Seals 11 prevent leakage past the body of the barrel clamp 3.

A steel cam follower 2, in the form of a disk slidable in follower guide 7 extending into the cylindrical bore 22, is biased outwardly by spring 10 and is attached to the rear end of the plunger 21.

A bleed valve 9 communicates through bleed passage 4 with the cylindrical bore 22 to bleed off excess fuel.

The pump body 5 is separated from actuator unit 25 by spacers 6 which ensure a rigid coupling. The actuator includes an air cylinder 4 containing a piston (not shown) with a protruding piston rod 8.

Figure 3:
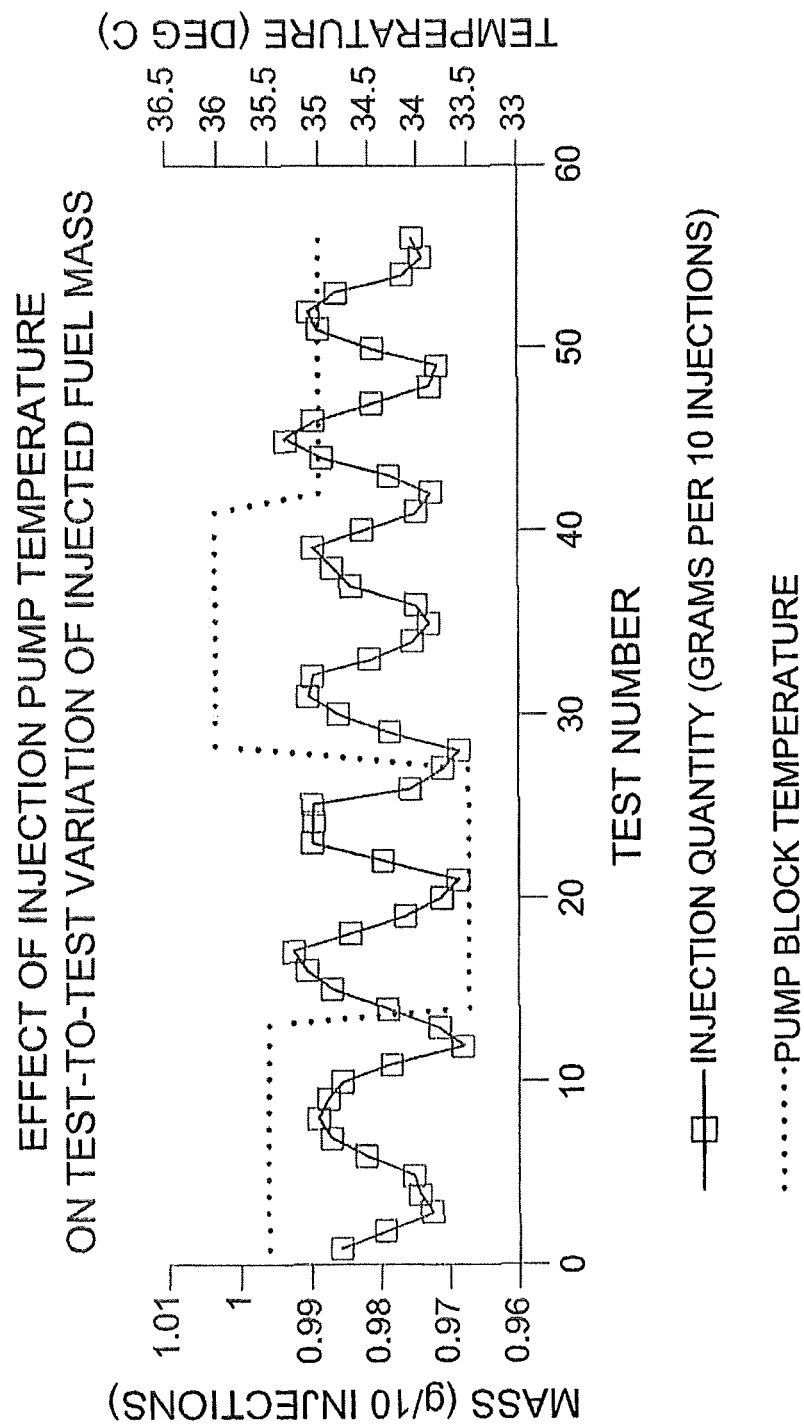
FIG. 3 is a chart illustrating results when the temperature within the fuel injection pump was varied.

One of the problems with the prior systems is variations in the quantity of fuel injected. To account for these variations, the present inventors conducted painstaking experimentation. For example, they surmised that possibly temperature fluctuations accounted for the variations. FIG. 3 illustrates the results of many temperature experiments they conducted and it can be seen that temperature had little effect on the readings. After about 7 years, the inventors finally determined that the variations were due to the rotation of the plunger 21 about its own long axis. This rotation, in conjunction with normal manufacturing imperfections causes cyclic variations in the quality of fuel injection. This variation increases the variability of the readings.

In FIG. 3, each numbered test value reports the quantity (mass) of fuel injected during 10 injection events. The graph shows that variations in the pump block temperature (the component where the barrel and plunger are located) were not responsible for the cyclical nature of the variations in injected fuel mass.

An associated problem to the rotation of the plunger 21 is the unpredictability of the rotation, causing even more variability in the readings.

Figure 4A:
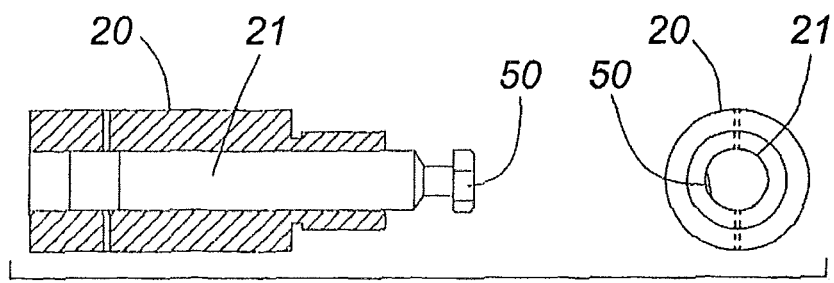
FIGS. 4a and 4b illustrate details of the plunger and dowel design of a fuel injection pump as contemplated by embodiments of the present invention.
Figure 4B:
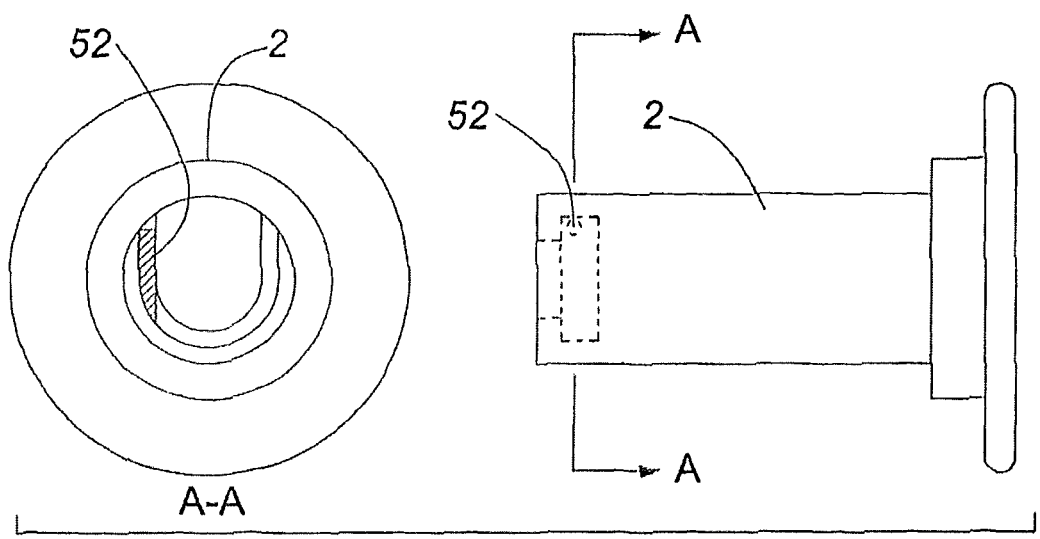

As a solution to this problem, the inventors have sought to devise a way of preventing this rotation of the plunger 21. Referring to FIGS. 4a and 4b, the surface of the plunger 21 is machined to include a flat surface 50. This flat surface 50 is held stationary against a securing means. In one embodiment, the securing means could be a dowel pin 52. Preferably the dowel pin 52 is added to the interior surface of follower 2. The dowel pin 52 rests against the flat surface 50.

Securing the plunger 21 against rotation within the barrel improves the reproducibility of the testing. It also provides the extra benefit of reduced wear and tear on the plunger 21, extending the life and thus, reducing cost and repair time.

Air is stored in container 13 at a pressure of 175 p.s.i. and periodically released, typically at the rate of five times per minute, by a signal from a controller into air cylinder 4 by pilot-operated solenoid valve 12. This causes piston rod 8 to strike the cam follower 2 through ball contact 31 with considerable force, driving home the plunger 21 and causing it to inject fuel into the combustion chamber at a pressure greater than 2500 psi. The ball contact 31 is important in that it helps to ensure concentric loading, which as mentioned above has proved important to obtain good repeatability of the injection profile.

On the return stroke, a limited and precise quantity of fuel is drawn from fuel supply 29, which is maintained at a controlled pressure of 50 psi, through the fuel supply passage 28 on the lower side of the bore 22. Any entrapped air is bled from the modular injection unit by bleed valve 9. The passages are preferably manufactured to fine tolerances using electric discharge machining (EDM).

When the fuel delivery is complete, the solenoid valve 12 is switched to exhaust air in cylinder 4 to atmosphere, and piston rod 8 and plunger 21 return under the action of spring 10 to the stand-by condition.

Two electric heaters 27 maintain a constant temperature in the pump block 5. A thermocouple continually monitors the temperature of the pump block 5 and the output is used to control the heaters. The pump block 5 is normally heated to 35±1° C. This is important to ensure constant viscosity of the fuel.

The above-described unit is capable of delivering 0.10 g of fuel within ±0.5% per cycle and can run without maintenance or adjustments for thousands of cycles at five cycles per minute, or at faster or slower frequencies. It can accurately inject fuels with cetane numbers lower than 15 to above 100 and viscosities of all available commercial fuels. It can also accurately inject gasoline and gasoline components with octane numbers lower than 50 to above well above 100 and viscosities of all available commercial gasoline type fuels. The construction can be made simple with a minimum number of moving parts. Each unit can be modular so that it can be bench tested and calibrated for installation on original equipment or supplied as a replacement exchange unit for equipment in the field. Used units may be re-cycled by over-haul and recalibration.

Figure 5:
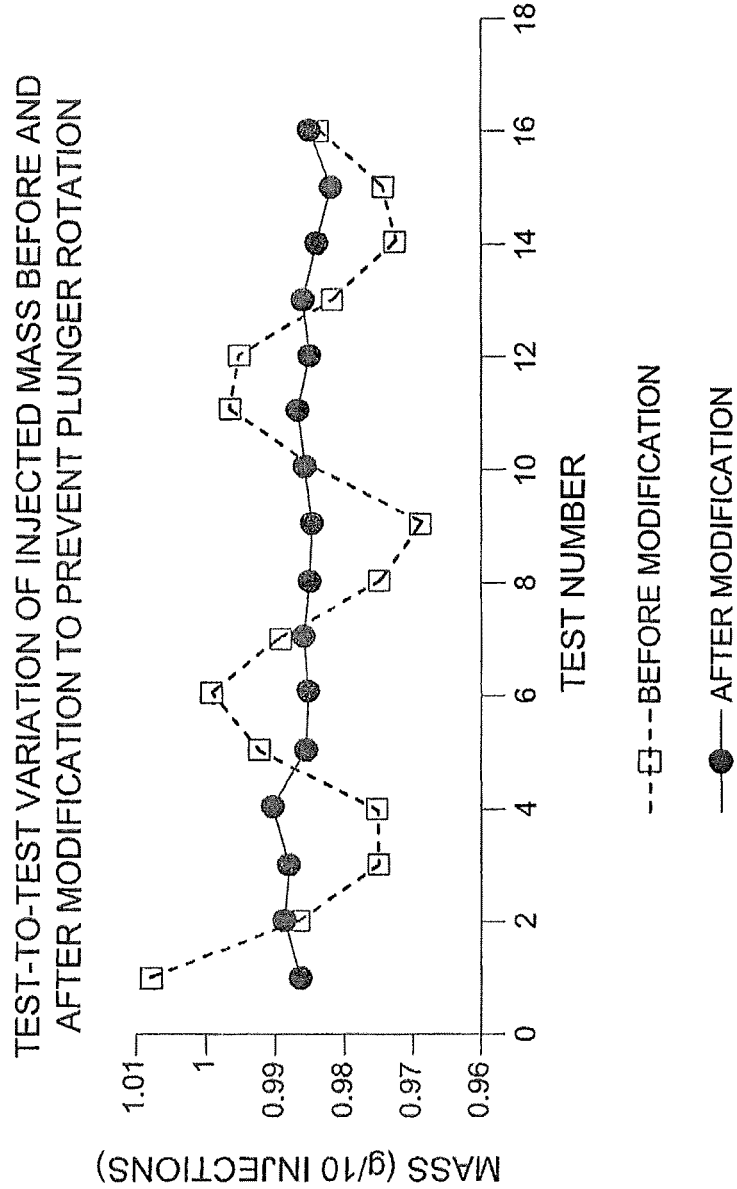
FIG. 5 is a chart illustrating the results of an IQT as contemplated by embodiments of the present invention.

FIG. 5 is a chart illustrating the results of an IQT as contemplated by embodiments of the present invention. Each numbered test reports the quantity (mass) of fuel injected during 10 injection events. As can be seen from FIG. 5, securing the plunger against rotation reduces variations in the quantity of fuel injected. This improves the repeatability of the instrument for measurements of the ignition quality of a fuel. It also improves the reproducibility of ignition quality measurements from different instruments.

The key components, such as the barrel and plunger, are preferably machined using electric discharge machining (EDM) to achieve fine tolerances.

The unit can be easily purged and bled when changing to fuels of differing specifications.

Embodiments of the elegant solution contemplated by the inventors has the added benefit that it can be retrofitted to existing IQT instruments. Initially, the inventors considered welding the new dowel pin to the plunger. However a new problem was encountered—plungers are calibrated specifically for their respective barrel and the heat from the welding changed the plunger size and fit within the barrel. Thus it is preferred to weld the dowel pin to the follower. To retrofit an existing IQT instrument, the follower is removed therefrom so the dowel pin can be welded onto it. The plunger is also removed so a flat surface can be ground into it. Preferably a bench grinder is used. The flat surface is sized and shaped to fit the geometry of the respective barrel.

Re-assembly requires that the modified follower and plunger are inserted back in place.

The described arrangement overcomes the problems of the prior art in that the various elements act together to provide a fuel injection unit that gives good repeatability of injection profile and does not suffer from pulsations and other undesirable effects. It is easy to calibrate. The small dimensions of the passages and the overall construction permit the elimination of dead spaces before the system is re-charged.

Numerous modifications may be made without departing from the spirit and scope of the invention as defined in the appended claims.

What is claimed is:

1. An air-assisted fuel injection system, comprising:
   a fuel pump body, said fuel pump body comprising:
   a cylindrical bore;
   a plunger and a barrel within the cylindrical bore, the plunger having a flat surface; and a securing means abutting against the flat surface to keep the plunger from rotating within the cylindrical bore.

2. The air-assisted fuel injection system of claim 1, further comprising a steel cam follower rotational locking mechanism.

3. The air-assisted fuel injection system of claim 2, wherein the steel cam follower is a cylinder slideable in the cylindrical bore.

4. The air-assisted fuel injection system of claim 1, wherein the securing means is a dowel pin.

5. The air-assisted fuel injection system of claim 1, wherein the barrel and plunger are machined using electric discharge machining.

\* \* \* \* \*